United States Patent [19]

Hessenthaler

[11] Patent Number: 5,020,228

[45] Date of Patent: * Jun. 4, 1991

[54] JIG FOR ALIGNING CUTTER BLADES TO A CUTTER HEAD

[76] Inventor: Geroge D. Hessenthaler, 1415 Skyview Dr., Salt Lake City, Utah 84117

[*] Notice: The portion of the term of this patent subsequent to Jul. 4, 2004 has been disclaimed.

[21] Appl. No.: 751,890

[22] Filed: Jul. 5, 1985

[51] Int. Cl.$^5$ ............................................. B27G 23/00
[52] U.S. Cl. ........................................ 33/628; 33/201; 33/178 D; 33/169 B
[58] Field of Search ................. 33/201, 180 R, 181 R, 33/178 D, 185 R, 169 B

[56] References Cited

U.S. PATENT DOCUMENTS

| | | | |
|---|---|---|---|
| 2,496,800 | 2/1950 | Larkins | 33/185 R |
| 2,886,896 | 5/1959 | Humphreville | 33/185 R |
| 3,903,609 | 9/1975 | Brown | 33/185 R |
| 4,519,142 | 5/1985 | Parker | 33/180 R |

FOREIGN PATENT DOCUMENTS 1260106  3/1961  France ............................... 33/185 R Primary Examiner—Willis Little
Attorney, Agent, or Firm—M. Reid Russell

[57] ABSTRACT

A jig for aligning cutter blades to a cutter head comprising a pair of spaced apart parallel base bars each pivotally connected to a pair of spaced apart arcuate supports and a knife bar parallel to the base bars and supported between the base bars by the supports and adjustable toward and away from the supports.

4 Claims, 1 Drawing Sheet

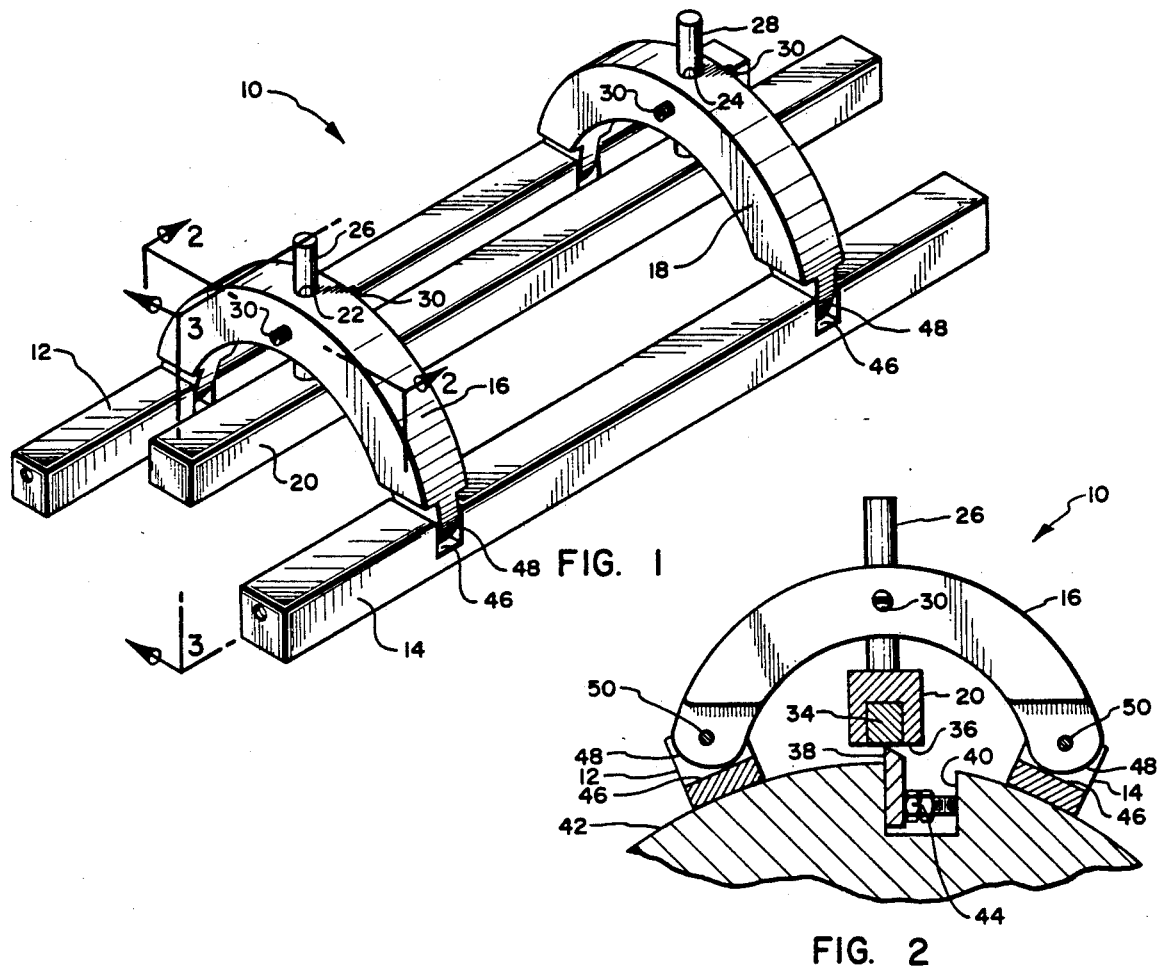
FIG. 1
FIG. 2
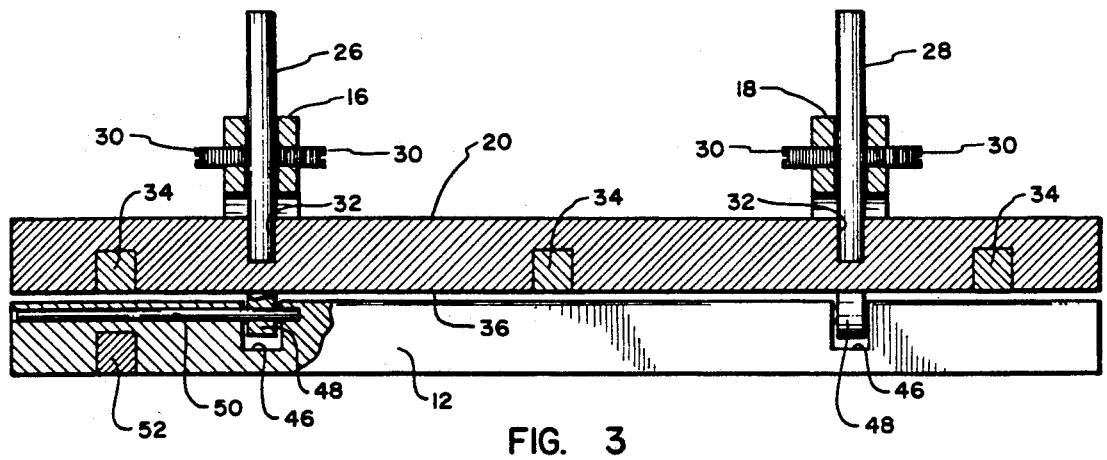
FIG. 3

JIG FOR ALIGNING CUTTER BLADES TO A CUTTER HEAD

BACKGROUND OF THE INVENTION

It is common practice to align the cutting knives on any size planers to the knife cutter-head. The cutter-heads are constructed of cylinders of various diameters, which contain several knives, and each knife must be positioned at the same cutting depth from the surface of the cutting head. A knife that is improperly aligned may do all the cutting because it extends above all the rest or it may not do any cutting if it is set lower than the other knives in the head. The correct positioning of all knives in the cutter-head insures uniform knife wear and a smooth rotating cutter-head since the head is more accurately balanced during rotation, when all knives are uniformly set. The correct positioning of each knife also produces a smoother planed surface on the wood being worked and the equipment can be safely operated at greater speed, without the knives gouging the wood stock.

The knives are removed periodically for sharpening or other purposes and it is important that they can be quickly changed and aligned to a common setting. The cutter-heads are cylindrical in shape and gaging and measurement are more difficult on such surfaces than they are on smooth flat surfaces.

1. Field of the Invention

This invention related to jigs for the setting of knife blades at a uniform height on cylindrical shaped cutter-heads, and is particularly concerned with setting knife blades on woodworking equipment.

2. Prior Art

Jigs and knife gauges have been available for setting knife blades on cutter-heads. Various models and configurations have been available and some have been known to include self-sharpening attachments.

BRIEF DESCRIPTION OF THE INVENTION

SUMMARY OF THE INVENTION

This invention provides a new and improved jig to align knife blades to cylindrical shaped cutter heads. The jig provides a means for varying the height adjustment of the knife in relationship to the cutter head as well as a means for supporting the jig and the knife while the knife is being secured to the cutter-head. The jig is constructed with a movable support base that permits it to self-align with the cutter head surface as well as to adapt to various size cylinders of different diameters.

Objects of the Invention

The present invention provides an improved method and apparatus for aligning a knife to a cutter-head while holding the knife in a suspended position to permit the operator to clamp the knife into that position. This invention provides a means for adjusting the jig to set the knife at various heights. The invention also provides a pivotal base to adapt to various size cutter-heads of different diameters. The invention is structured to allow for access areas within the configuration of the jig to permit the operation of knife clamping means without interfering with the jig.

Other objects and features of the invention will become apparent from the following detailed description and drawing disclosing what are presently contemplated as being the best modes of the invention.

THE DRAWING

In the drawings:

FIG. 1, is a perspective view of the jig;

FIG. 2, is a fragmentary end elevation view of the invention mounted on a cutter-head (shown fragmentarily) and with the knife support bar and base bars broken away to reveal magnetic and pivotal means; and FIG. 3, a longitudinal section taken on line 3—3 of FIG. 1.

DETAILED DESCRIPTION OF THE INVENTION

Referring now to the drawings:

In the illustrated preferred embodiment, the jig shown generally at 10 is constructed with parallel base bars 12 and 14 that are pivotally attached to the two arcuate supports 16 and 18, respectively, supports 16 and 18 support a knife bar 20, which is positioned between and parallel to the two pivotal base bars 12 and 14. Holes 22 and 24 are respectively formed through the mid-points of arcuate supports 16 and 18 so that a suspension rod 26 may be into hole 22 and suspension rod 28 may be inserted into hole 24. Holes for set screws 30 are drilled and tapped transversely to holes 22 and 24 and the set screws 30 are tightened against the inserted suspension rods 26 and 28. Sufficient pressure is maintained by the set screws to lock the suspension rods place in the supports 16 and 18. Suspension rods 26 and 28 are also press fitted into holes 32 formed in the knife bar 20.

Magnets 34, spaced along the bottom surface 36 of knife support bar 20 are arranged to have surfaces flush with the bottom surface 36 of the knife support bar 20.

In using the jig 10, a cutting knife 38 is placed in a receiving groove 40 of a cutter head 42 as, shown in FIG. 2. The jig 10 is positioned on the head, over the knife 38. Knife support bar 20 is then adjusted to a correct height and the set screws 30 are tightened to lock the bar in position. After the desired height of knife bar 20 is set, knife 38 is raised until its cutting edge contacts and is magnetically held against the magnets 34 spaced along the bottom surface 36 of knife support bar 20. A knife securement means 44 is tightened to lock the knife 38 against movement at a correct position relative to cutter head 42. Each knife in the cutter head is similarly set, if necessary.

Base bars 12 and 14 of jig 10 have notches 46 in the top thereof to receive rounded ends 48 of arcuate supports 16 and 18. A pin 50 is inserted through a bore in each base bar and through the ends 48 to pivotally connect the ends to the base bars. The pivotal connections of the ends 48 allow the base bars to pivot about the axis of the pins and make it possible for the base bars to be angled into firm engagement with cutter heads of varying diameters.

The combination of the pivoting base bars and adjustable knife bar make it possible for the jig to be used on a large variety of cutter heads.

As shown best in FIG. 3, on the break-a-way section of base bar 12, the base bars 12 and 14 also have base magnets 52 similar to magnets 34 in knife bar 20, mounted in the bottom thereof. The desired size and weight of the jig is the determining factor for sizing and spacing of magnets 52 along the base bars with the magnets being sized and spaced according to the magnetic pull required to hold the jog and the cutter knife in position on the cutter-head.

Although a preferred form of my invention has been herein disclosed, it is to be understood that the present disclosure is by way of example and that variations are possible without departing from the subject matter coming within the scope of the following claims, which subject matter I regard as my invention.

I claim:

1. A jig for aligning cutter blades to a cutter head comprising: a pair of base bars, means holding the base bars in spaced apart, parallel relationship, said means including at least two support means, and means pivotally attaching ends of each of the support members to a base bar;

a knife bar extending between and parallel to the base bars, said knife bar being supported at spaced positions therealong by the support members means carried by each of said support members and connected to the knife bar at said spaced positions for adjustably positioning the knife bar in a plane extending normal to the plane containing the parallel base bars; and magnets in the bottom surfaces of the base bars and the knife bar.

2. A jig as in claim 1, wherein the means for adjustably positioning the knife bar includes at least a pair of spaced suspension rods fixed to and projecting from a top of the knife bar;

a hold for each suspension rod through a support member; and a set screw threaded into each support member having a suspension rod therein and adapted to engage the suspension rod to secure the rod and the knife bar connected thereto in set position.

3. A jig as in claim 1, wherein the magnets in each of the bottom surfaces of the base bars and knife bar comprises a plurality of magnets spaced along the bottoms of such bars.

4. A jig as in claim 2, wherein the magnets in each of the bottom surfaces of the base bars and knife bar comprise a plurality of magnets spaced along the bottoms of such bars.

* * * * *